D. R. MURPHY.
THROTTLE VALVE.
APPLICATION FILED MAR. 11, 1918.

1,315,387.

Patented Sept. 9, 1919.

WITNESSES

INVENTOR
Daniel R. Murphy.
By J. N. Cooke
Attorney.

UNITED STATES PATENT OFFICE.

DANIEL R. MURPHY, OF UNIONTOWN, PENNSYLVANIA.

THROTTLE-VALVE.

1,315,387.      Specification of Letters Patent.      Patented Sept. 9, 1919.

Application filed March 11, 1918. Serial No. 221,636.

*To all whom it may concern:*

Be it known that I, DANIEL R. MURPHY, a citizen of the United States, and resident of Uniontown, in the county of Fayette and State of Pennsylvania, have invented a new and useful Improvement in Throttle-Valves; and I do hereby declare the following to be a full, clear, and exact description thereof.

This invention relates to air and gas valves, and more particularly to throttle valves for use in locomotives, and has for its primary object the provision of a valve of this type that will provide a pilot valve which will open before the main valve and allow passage of a sufficient quantity of fluid therethrough to start the locomotive before the main valve is opened.

Another and important object is the provision of a valve of this class to be of a plunger type and composed of a minimum number of parts, thereby lessening the wear and producing a valve less likely to get out of order than types now generally used.

And still further objects, such as simplicity, cheapness of manufacture, and the general improvement of the art will be brought out in the following specification and illustrated in the accompanying drawings, in which—

Figure 1:
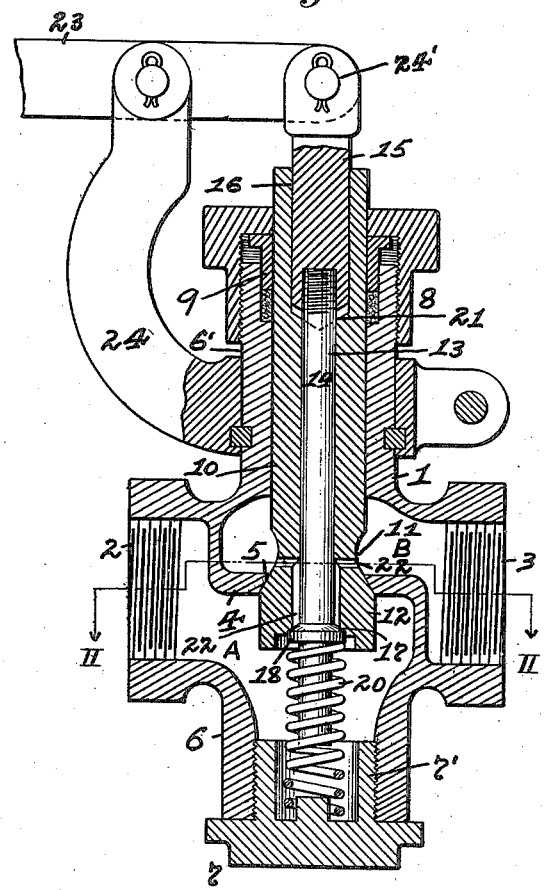
Figure 2:
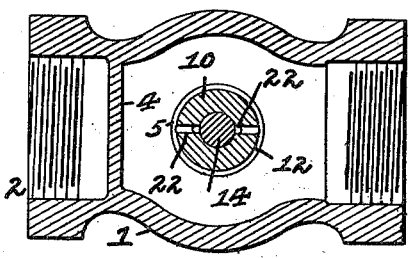

Figure 1 is a longitudinal sectional view through my valve embodying my invention and showing the relative positions of the parts when the valve is closed; and Fig. 2 is a cross sectional view on the line 11—11 of Fig. 1.

Referring more particularly to the drawings, the numeral 1 designates the casing of my improved valve, which is substantially T-shaped, the cross-head of the T-shaped casing forming inlet and outlet passages 2 and 3 respectively. Such casing is divided into two compartments or chambers A and B by a partition member 4 having an aperture therein, the periphery of which forms a valve seat 5.

One end 6 of the body or casing nearest the chamber A is closed by a screw-threaded plug 7 having a cylindrical centrally arranged projection 7' thereon, and the other end 6' of said body portion is screw-threaded to receive a cap member 8, which is internally recessed to form a stuffing box 9.

A main plunger valve member 10 having a sliding close fit within the body portion, is cut away at 11 to form a valve head 12, which is adapted to seat upon the valve seat 5 in the partition 4.

The plunger valve 10 has a centrally arranged aperture 13 for the reception of a pilot valve plunger 14, which is screw-threaded in the operating plunger 15 mounted within the enlarged portion of the aperture 13. The inner terminal of the aperture 13 is enlarged to form a valve seat 17 adapted to receive the pilot valve 18 formed on the plunger 14. The plunger 14 projects beyond the valve 18 to form a guiding post 19 for coil spring 20 which is mounted over such post, with its one end bearing against the valve 18 and its other end against the plug 7, and such spring being adapted to normally force the valve 18 into seated position on the seat 17.

The arrangement of the aperture 13 and its enlarged portion 16, provides a shoulder portion 21 against which the operating plunger 15 is adapted to bear when moved inwardly. When the pilot valve 14 is seated, the inner end of the operating plunger is spaced slightly from the shoulder 21, so that when such plunger is moved inwardly the pilot valve will be opened an appreciable distance before such plunger strikes the shoulder 21.

Small apertures 22 are formed through the valve head 12 and adapted to be closed by the pilot valve 18. These apertures form passages from the portion A of the valve through the valve member 10 to the portion B.

It will be readily seen that the slightest inward movement of the plunger 15 will move the plunger 14 and unseat the valve 18, thus establishing communication between the inlet and outlet passages 2 and 3 through the apertures 22.

An actuating lever 23 is pivotally mounted on the bearing arm 24, which is secured to the valve casing 1 in any desired manner. The lever 23 has its one end pivotally connected to the operating plunger 15, as at 24', and is adapted to have its other end connected to an operating rod or cable (not shown).

The operation of my valve is as follows: Assuming that the device is assembled and in operative position on a locomotive, and it being desired to start such locomotive, the actuating lever 23 is moved in such a manner as to force the operating plunger 15 inwardly until it strikes the shoulder portion 21 of the plunger valve 10, thus opening communication between the chambers A and B through the apertures 22. Sufficient fluid will pass through such apertures to start the locomotive without a load; or if such locomotive is loaded, sufficient fluid will flow through such apertures to gently fill the cylinders.

When more power is desired, the actuating lever 23 is moved forward thereby forcing the actuating plunger 15 inwardly against the shoulder 21, thus unseating the valve head 12 and permitting a greater inflow of fluid.

To close the valves it is only necessary to release the operating lever 23, and the coil spring 20 will force the pilot valve 18 and the main valve 12 into engagement with the respective valve seats.

It will readily be seen that in the above I have provided a throttle valve with a greater efficiency than any valves heretofore used and a valve that will positively prevent blowing out of cylinder-heads, or other such expense common to locomotives, for the reason that a full inflow of fluid is not allowed to enter the cylinders at the first movement of the throttle; but on the contrary, a pilot valve is first opened to allow a light pressure of fluid to enter.

While I have shown and described one specific form of my invention, it will be readily understood that various changes in the design and details of structure may readily be made by mechanics skilled in the art without departing from the spirit of my invention, as defined in the accompanying claim.

Having thus described my invention, what I claim is:—

A throttle valve comprising a casing having a stuffing box, a partition in such casing having a valve seat formed therein, a plunger forming a valve member slidably mounted in said casing and extending through the stuffing box, a valve head formed on said plunger and adapted to be seated on said valve seat, a second plunger slidably mounted in said first named plunger, the bore through the first named plunger being enlarged at its outer end to form a shoulder therein, said second plunger fitting closely within said first named plunger and having an enlarged portion thereon, one end of which portion is attached to an operating means and the other end of which portion provides a shoulder for coöperating with the shoulder in the first named plunger, a valve head formed on said second plunger, a valve seat on said first named valve head, passage ways through said first named valve head in communication with the outlet and terminating in said last named valve seat, said second named valve head being adapted to be seated on said second named valve seat to close said passage ways, a spring member for normally holding said valves closed, and means for opening said valves, the second named plunger being first movable to bring its shoulder into engagement with the shoulder in the first named plunger whereby said second named valve will be the first to open.

In testimony whereof I, the said DANIEL R. MURPHY, have hereunto set my hand.

DANIEL R. MURPHY.

Witnesses:
J. M. GEOGHEGAN,
J. G. JACKSON.